(12) United States Patent
Kang et al.

(10) Patent No.: US 8,738,239 B2
(45) Date of Patent: May 27, 2014

(54) SWING CONTROL SYSTEM AND METHOD FOR CONSTRUCTION MACHINE USING ELECTRIC MOTOR

(75) Inventors: Jong Min Kang, Changwon-si (KR); Ahn Kyun Jung, Changwon-si (KR); Chun Seung Lee, Gimhae-si (KR); Ji Yun Kim, Changwon-si (KR); Dong Uk Choi, Changwon-si (KR); Jung Sun Jo, Changwon-si (KR); Sung Kon Kim, Gimhae-si (KR); Bong Soo Yoo, Gyeongsangnam-do (KR)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 569 days.

(21) Appl. No.: 12/817,342

(22) Filed: Jun. 17, 2010

(65) Prior Publication Data

US 2011/0029206 A1      Feb. 3, 2011

(30) Foreign Application Priority Data

Jul. 28, 2009   (KR) ........................ 10-2009-0069023

(51) Int. Cl.
    *G06F 7/70*   (2006.01)
(52) U.S. Cl.
    USPC ............................................. 701/50
(58) Field of Classification Search
    USPC ............................................. 701/50
    See application file for complete search history.

(56) References Cited

U.S. PATENT DOCUMENTS

| | | | | |
|---|---|---|---|---|
| 3,518,444 A | * | 6/1970 | Barber | 290/14 |
| 4,070,926 A | * | 1/1978 | Schneider et al. | 74/731.1 |
| 4,615,174 A | * | 10/1986 | Nagahara | 60/442 |
| 6,170,681 B1 | * | 1/2001 | Yoshimatsu | 212/278 |
| 6,256,553 B1 | * | 7/2001 | Erikkila | 700/213 |
| 2008/0300757 A1 | * | 12/2008 | Kanayama et al. | 701/50 |
| 2012/0090309 A1 | * | 4/2012 | Kim | 60/327 |
| 2012/0101696 A1 | * | 4/2012 | Udagawa | 701/50 |

FOREIGN PATENT DOCUMENTS

| EP | 56865 A | * | 8/1982 |
|---|---|---|---|
| JP | 2006112114 A | * | 4/2006 |

* cited by examiner

*Primary Examiner* — Behrang Badii
*Assistant Examiner* — Daniel L Greene
(74) *Attorney, Agent, or Firm* — Ladas & Parry

(57) ABSTRACT

A swing control system and method for a construction machine using an electric motor is provided. The swing control system includes a swing electric motor swinging an upper swing structure and a swing control unit. The swing control unit includes a reference speed calculation means for calculating a reference swing speed and a maximum acceleration according to a manipulation signal of a control lever for a swing manipulation; a swing speed determination means for calculating a first speed change amount from a difference between the reference swing speed and an actual swing speed by the electric motor that is currently fed back, calculating a second speed change amount for a sampling time from the maximum acceleration, and determining a swing speed according to the manipulation signal by comparing the first speed change amount and the second speed change amount and adding a smaller amount between the first speed change amount and the second speed change amount obtained as the result of comparison to the actual swing speed currently fed back; and an output torque control means for controlling an output torque of the electric motor by generating a control signal for the determined swing speed.

9 Claims, 5 Drawing Sheets

SWING CONTROL SYSTEM AND METHOD FOR CONSTRUCTION MACHINE USING ELECTRIC MOTOR

CROSS-REFERENCE TO RELATED APPLICATION

This application is based on and claims priority from Korean Patent Application No. 10-2009-69023 filed on Jul. 28, 2009 in the Korean Intellectual Property Office, the disclosure of which is incorporated herein in its entirety by reference.

BACKGROUND OF THE INVENTION

1. Field of the Invention

The present invention relates to a swing control system and method for a construction machine using an electric motor. More particularly, the present invention relates to a swing control system and method for a construction machine using an electric motor, which can provide the output characteristic that is similar to that of the existing hydraulic system in place of a hydraulic motor used to rotate an upper swing structure of a construction machine, and particularly a hydraulic excavator.

2. Description of the Prior Art

In the related art, an upper swing structure of a construction machine, and particularly a hydraulic excavator, including the upper swing structure is rotated by a hydraulic motor. The hydraulic motor has a high torque output and the characteristic of a hydraulic system of which the control is relatively simple. Since it is difficult that any other actuator replaces the hydraulic system having the high torque output, the hydraulic system has mainly been used in heavy equipment and so on. The hydraulic drive system using a hydraulic motor has low energy efficiency due to resistance in a control valve that controls the discharge rate of a hydraulic pump, a pressure loss in pipes, generation of a surplus flow rate in a hydraulic circuit, and the like. Also, when the upper swing structure stops after a swing operation, braking energy is consumed as heat energy, and this causes the efficiency of the hydraulic motor to be lowered.

Accordingly, the use of an electric motor as an actuator has been known to heighten the energy efficiency. The efficiency of an electric system is far superior to that of the hydraulic system. In the case of using the electric motor as the swing motor of the construction machine, the energy efficiency is improved, but the response of the electric motor to lever manipulation is too sensitive in comparison to that of the hydraulic drive system, and this causes the manipulability of the electric motor to become deteriorated rather than that of the hydraulic drive system.

In order to solve this problem, Korean Patent Application Publication No. 2005-0000530 discloses the related art that adopts an electric swing motor in place of a hydraulic motor.

According to the technique in the related art, complicated governing equations are derived from an emulation model of an excavator hydraulic system, and the hydraulic system is controlled through real-time operation. Accordingly, a lot of control operation time is required due to the complicated calculation, and a high-performance processor that can perform high-speed operation is required.

Recently, with the development of technology, a permanent magnet synchronous motor (PMSM), which can generate a high-torque output and has a superior control performance, has been developed. This PMSM can replace the current hydraulic system to solve the problems of the hydraulic system, and the braking energy occurring when the swing system stops can be withdrawn through the driving of electric generation of the PMSM to improve the efficiency. As the swing system is changed from the hydraulic motor to the PMSM, the efficiency is heightened. However, if the characteristic change due to the change of the actuator occurs, existing users may feel inconvenience, and this may cause the working efficiency to deteriorate and cause a user to avoid purchase of a hybrid excavator.

SUMMARY OF THE INVENTION

Accordingly, the present invention has been made to solve the above-mentioned problems occurring in the prior art while advantages achieved by the prior art are maintained intact.

The present invention proposes a control technique of an electric swing system for providing the output characteristic that is similar to that of the existing hydraulic system to solve the problem that existing excavator users feel inconvenience due to the change of a power source that is caused by a difference in output characteristic between a hydraulic motor and an electric motor.

Also, the present invention proposes a control technique which can solve the above-described problem through the use of an inexpensive controller by controlling a control algorithm that includes only simple equations verified through simulations.

In one aspect of the present invention, there is provided a swing control system for a construction machine including a swing electric motor swinging an upper swing structure and a swing control unit, wherein the swing control unit includes a reference speed calculation means for calculating a reference swing speed and a maximum acceleration according to a manipulation signal of a control lever for a swing manipulation; a swing speed determination means for calculating a first speed change amount from a difference between the reference swing speed and an actual swing speed by the electric motor that is currently fed back, calculating a second speed change amount for a sampling time from the maximum acceleration, and determining a swing speed according to the manipulation signal by comparing the first speed change amount and the second speed change amount and adding a smaller amount between the first speed change amount and the second speed change amount obtained as the result of comparison to the actual swing speed currently fed back; and an output torque control means for controlling an output torque of the electric motor by generating a control signal for the determined swing speed.

In the swing control system according to a preferred embodiment of the present invention, the reference speed calculation means calculates the reference swing speed and the maximum acceleration according to the manipulation signal with limiting of absolute values of the reference swing speed and the maximum acceleration in a predetermined upper limit range, and the predetermined upper limit is the maximum value of the swing speed and the maximum acceleration according to pilot signal pressure when a hydraulic swing motor is used.

In the swing control system according to a preferred embodiment of the present invention, the reference speed calculation means calculates the reference swing speed and the maximum acceleration according to the manipulation signal, correcting the reference swing speed and the maximum acceleration by applying speed and acceleration correction values according to an engine mode of the construction machine to the calculated reference swing speed and maximum acceleration, respectively, and transmitting the corrected reference swing speed and maximum acceleration to the swing speed determination means.

The swing control system according to a preferred embodiment of the present invention further includes a memory unit storing reference swing speed and maximum acceleration response data according to the pilot signal pressure when the hydraulic swing motor is used, wherein the reference speed calculation means of the swing control unit calculates the reference swing speed and the maximum acceleration according to the manipulation signal from the reference swing speed and maximum acceleration response data stored in the memory unit.

In the swing control system according to a preferred embodiment of the present invention, the reference speed calculation unit calculates the pilot signal pressure when the hydraulic swing motor is used, which corresponds to the manipulation signal, and calculates the reference swing speed and the maximum acceleration according to the calculated pilot signal pressure from the reference swing speed and maximum acceleration response data stored in the memory unit.

In the swing control system according to a preferred embodiment of the present invention, the swing speed determination means determines the swing speed according to the manipulation signal by adding the first speed change amount to the actual swing speed currently fed back without comparing the first speed change amount and the second speed change amount if the pilot signal pressure when the hydraulic swing motor is used, which corresponds to the manipulation signal, is smaller than a predetermined value.

In another aspect of the present invention, there is provided a swing control method for a construction machine for swinging an upper swing structure using a swing electric motor, which includes a reference speed calculation step of calculating a reference swing speed and a maximum acceleration according to a manipulation signal of a control lever for a swing manipulation; a swing speed change amount calculation step of receiving a feedback of an actual swing speed by the electric motor, calculating a first speed change amount from a difference between the actual swing speed currently fed back and the reference swing speed, and calculating a second speed change amount for sampling time from the maximum acceleration; a swing speed determination step of determining a swing speed according to the manipulation signal by comparing the first speed change amount and the second speed change amount and adding a smaller amount between the first speed change amount and the second speed change amount obtained as the result of comparison to the actual swing speed currently fed back; and an output torque control step of controlling an output torque of the electric motor by generating a control signal for the determined swing speed.

In the swing control method according to a preferred embodiment of the present invention, the reference speed calculation step calculates the reference swing speed and the maximum acceleration according to the manipulation signal with limiting of absolute values of the reference swing speed and the maximum acceleration in a predetermined upper limit range, and the predetermined upper limit is the maximum value of the swing speed and the maximum acceleration according to pilot signal pressure when a hydraulic swing motor is used.

In the swing control method according to a preferred embodiment of the present invention, the reference speed calculation step calculates the reference swing speed and the maximum acceleration according to the manipulation signal, and correcting the reference swing speed and the maximum acceleration by applying speed and acceleration correction values according to an engine mode of the construction machine to the calculated reference swing speed and maximum acceleration, respectively, and the speed change amount calculation step calculates the first speed change amount and the second speed change amount from the corrected reference swing speed and maximum acceleration.

In the swing control method according to a preferred embodiment of the present invention, the reference speed calculation step includes a pilot signal pressure calculation step of calculating the pilot signal pressure when the hydraulic swing motor is used, which corresponds to the manipulation signal; and a reference swing speed calculation step of calculating the reference swing speed and the maximum acceleration according the calculated pilot signal pressure from the reference swing speed and maximum acceleration response data according to the pre-stored pilot signal pressure when the hydraulic swing motor is used.

In the swing control method according to a preferred embodiment of the present invention, the swing speed change amount calculation step calculates the first speed change amount, and the swing speed determination step determines the swing speed according to the manipulation signal by adding the first speed change amount to the actual swing speed currently fed back without comparing the first speed change amount and the second speed change amount, if the pilot signal pressure calculated in the pilot signal pressure calculation step is smaller than a predetermined value.

As preferred embodiments of the present invention, embodiments according to diverse possible combination of the above-described technical features may be included.

With the above-described construction, a swing system for a construction machine having a similar characteristic to the existing hydraulic system can be implemented while maintaining the advantages of the electric motor as they are.

Also, since the swing control system performs an operation that includes only simple equations verified through simulations, the control is possible even using an inexpensive processor without exerting a great influence upon the controller operation speed and without the necessity of high-speed operation.

It is apparent that diverse effects which have not been directly mentioned can be derived by those skilled in the art from diverse constructions according to the embodiments of the present invention.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

First, a swing control system for a construction machine using an electric motor according to an embodiment of the present invention will be described.

Figure 1:
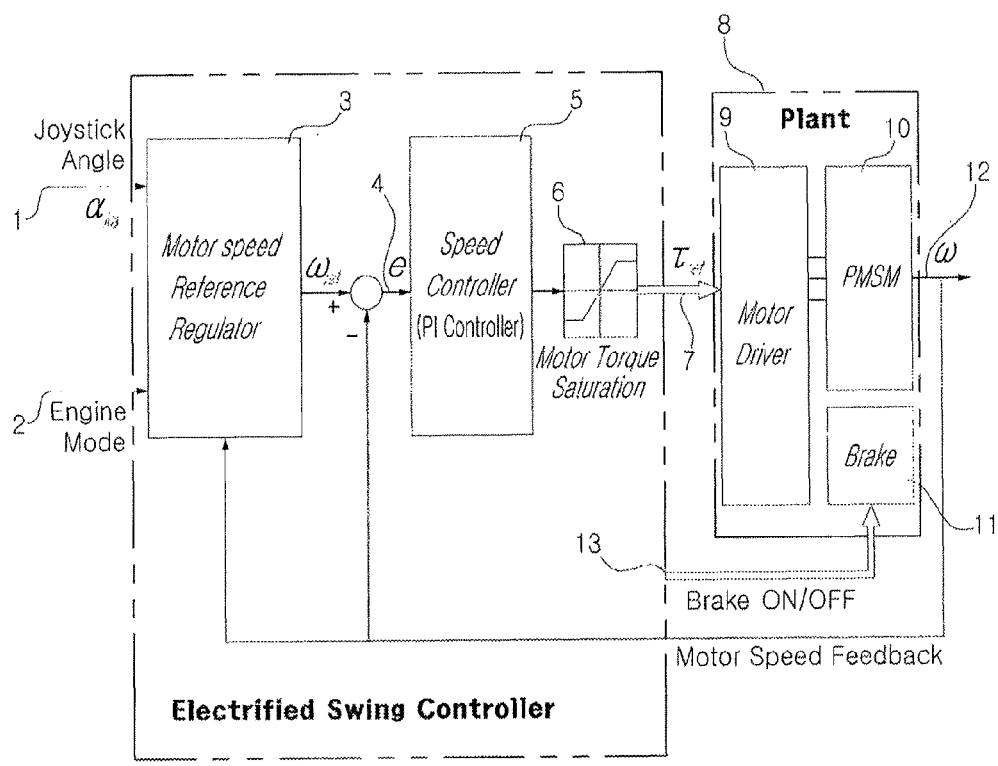
FIG. 1 is a block diagram explaining the control of a swing system for construction machine using an electric motor according to an embodiment of the present invention.
Figure 2:
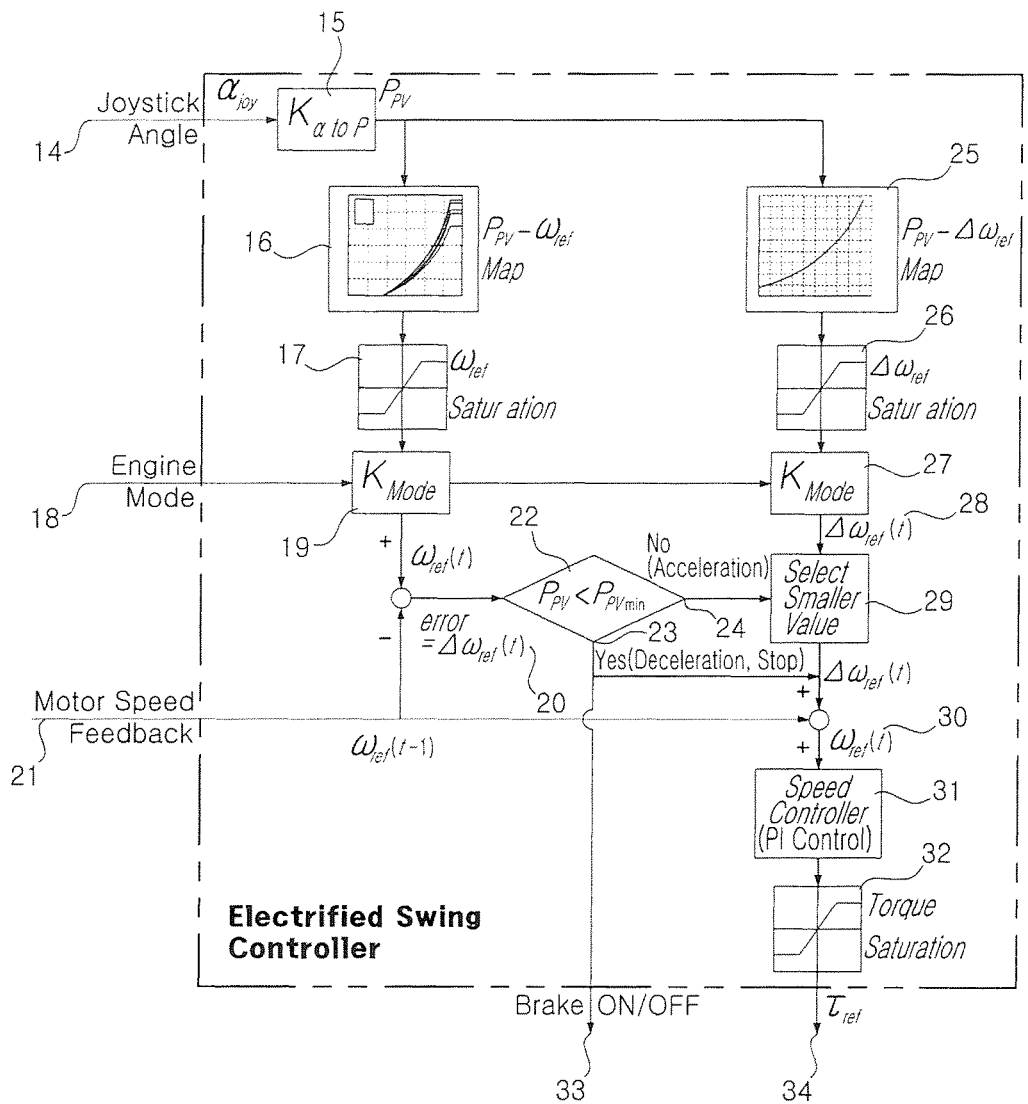
FIG. 2 is a block diagram explaining the swing control of a construction machine using an electric motor according to an embodiment of the present invention.
Figure 3:
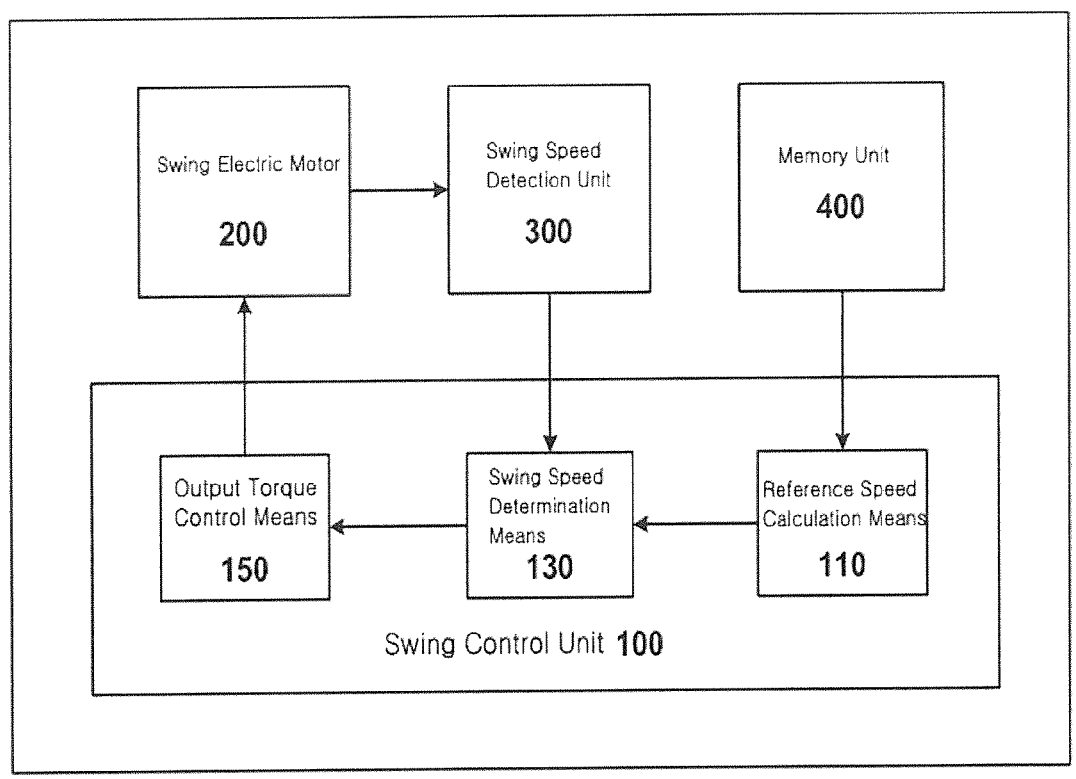
FIG. 3 is a schematic block diagram illustrating the configuration of a swing control system for a construction machine using an electric motor according to an embodiment of the present invention.

FIG. 1 is a block diagram explaining the control of a swing system for a construction machine using an electric motor according to an embodiment of the present invention, and FIG. 2 is a block diagram, explaining the swing control of a construction machine using an electric motor according to an embodiment of the present invention. FIG. 3 is a schematic block diagram illustrating the configuration of a swing control system for a construction machine using an electric motor according to an embodiment of the present invention.

Referring to FIG. 3, a swing control system for a construction machine according to an embodiment of the present invention includes a swing electric motor 200 for swinging an upper swing structure and a swing control unit 100. Preferably, the swing electric motor 200 is a permanent magnetic synchronous motor (PMSM). In an embodiment of the present invention, the swing control unit 100 includes a reference speed calculation means 110, a swing speed determination means 130, and an output torque control means 150.

The reference speed calculation means 110 calculates a reference swing speed and a maximum acceleration according manipulation signal of a control lever (not illustrated) for a swing manipulation. Referring to FIG. 2, in an embodiment of the present invention, the reference speed calculation means 110 receives the manipulation signal the control lever, for example, a joystick angle $\alpha_{joy}$ 14, and calculates the reference swing speed and the maximum acceleration according to pilot signal pressure that corresponds to the joystick angle $\alpha_{joy}$ from reference swing speed and maximum acceleration response data 16 and 25 in accordance with the pilot signal pressure when a hydraulic swing motor is used.

Referring to reference numerals 17 and 26 in FIG. 2, the reference speed calculation means 110 calculates the reference swing speed and the maximum acceleration according to the manipulation signal with limiting of absolute values of the reference swing speed and the maximum acceleration in a predetermined upper limit range. In this case, the maximum value of the swing speed and the maximum acceleration according to the pilot signal pressure when the hydraulic swing motor is used may be set as a predetermined upper limit value.

In an embodiment of the present invention, referring to FIG. 2, the reference speed calculation means 110 calculates the reference swing speed and the maximum acceleration according to the manipulation signal, corrects the reference swing speed and the maximum acceleration 19 and 27 by applying speed and acceleration correction values according to an engine mode 18 of the construction machine to the calculated reference swing speed and maximum acceleration, respectively, and transmits the corrected reference swing speed and maximum acceleration to the swing speed determination means 130.

Then, the swing speed determination means 130 of the swing control unit 110 calculates a first speed change amount 20 from a difference between the reference swing speed and an actual swing speed 21 by the electric motor 200 that is currently fed back, calculates a second speed change amount 28 for a sampling time from the maximum acceleration, and determines a swing speed 30 according to the manipulation signal by comparing the calculated first speed change amount and second speed change amount and adding a smaller amount between the first speed change amount 20 and the second speed change amount 28 obtained as the result of comparison to the actual swing speed 21 currently fed back. Referring to FIG. 3, the actual swing speed 21 currently fed back is a rotating speed of the swing motor 200 detected by the swing speed detection means 300.

In an embodiment of the present invention, if the pilot signal pressure when the hydraulic swing motor is used, which corresponds to the manipulation signal, is smaller than predetermined value, the swing speed determination means 130 determines the swing speed according to the manipulation signal by adding the first speed change amount 20 to the actual swing speed 21 without comparing the first speed change amount and the second speed change amount. For example, if the joystick angle of the control lever is in a neutral state, this corresponds to a deceleration or stop command, and thus the first speed change amount 20 is used without comparing it with the second speed change amount 28 for the sampling time from the maximum acceleration. The deceleration appears more quickly than the acceleration due to the deceleration characteristic of the typical hydraulic motor, wherein the deceleration is performed by blocking the hydraulic flow itself, and thus by reflecting the deceleration characteristic of the existing hydraulic system, the existing users can be prevented from feeling inconvenience.

The output torque control means 150 generates a control signal for the determined swing speed to control the output torque of the electric motor 200.

Also, referring to FIG. 3, the swing control system further includes a memory unit 400 that stores reference swing speed and maximum acceleration response data according to the pilot signal pressure when the hydraulic swing motor is used. In this embodiment of the present invention, the reference speed calculation means 110 of the swing control unit 100 calculates the reference swing speed and the maximum acceleration according to the manipulation signal from the reference swing speed and maximum response data stored in the memory unit 400.

Further, in another embodiment of the present invention, the reference speed calculation means 110 calculates the pilot signal pressure when the hydraulic swing motor is used, which corresponds to the manipulation signal, and calculates the reference swing speed and the maximum acceleration according to the calculated pilot signal pressure from the reference swing speed and maximum acceleration response data stored in the memory unit 400.

Next, a swing control method for a construction machine using an electric motor according to another embodiment of the present invention will be described. In explaining the swing control method, explanation of portions overlapping the explained portions of the swing control system for a construction machine will be omitted. The swing control method for a construction machine using an electric motor according to an embodiment of the present invention refers to the swing control method for construction machine that swings the upper swing structure using the swing electric motor 200.

Figure 4:
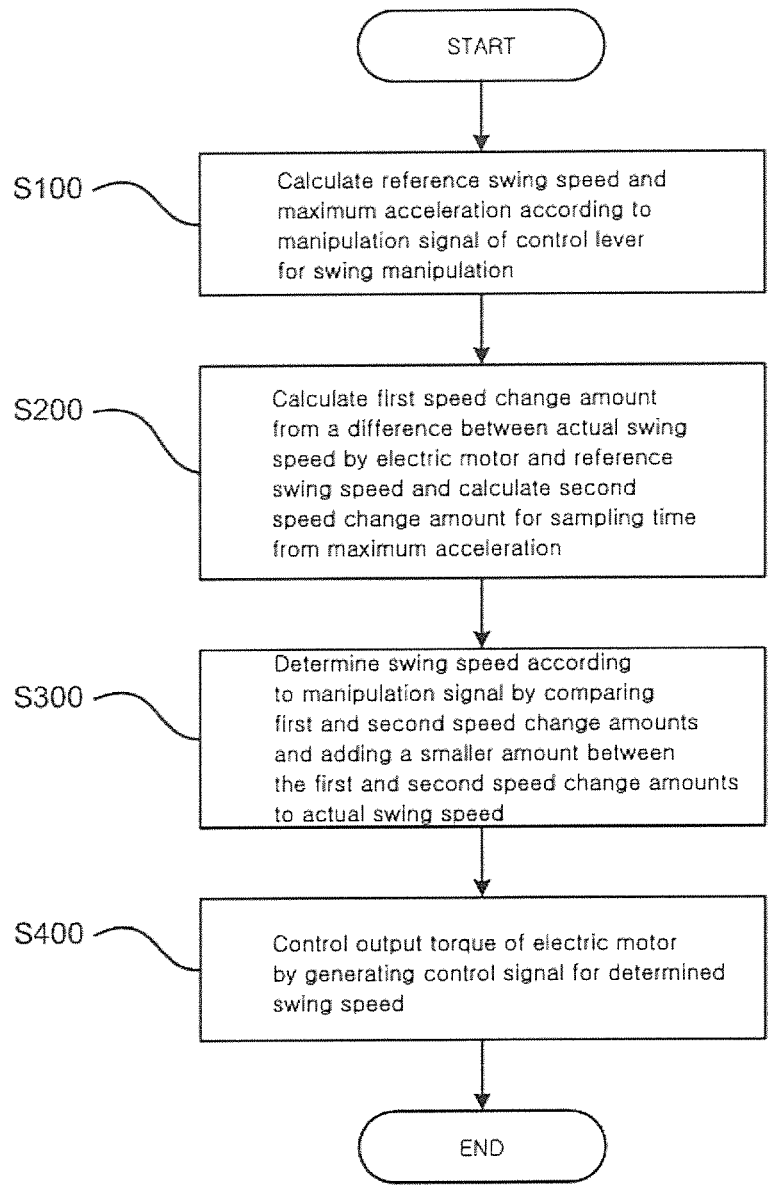
FIG. 4 is a flowchart illustrating a swing control method for a construction machine using an electric motor according to another embodiment of the present invention.
Figure 5:
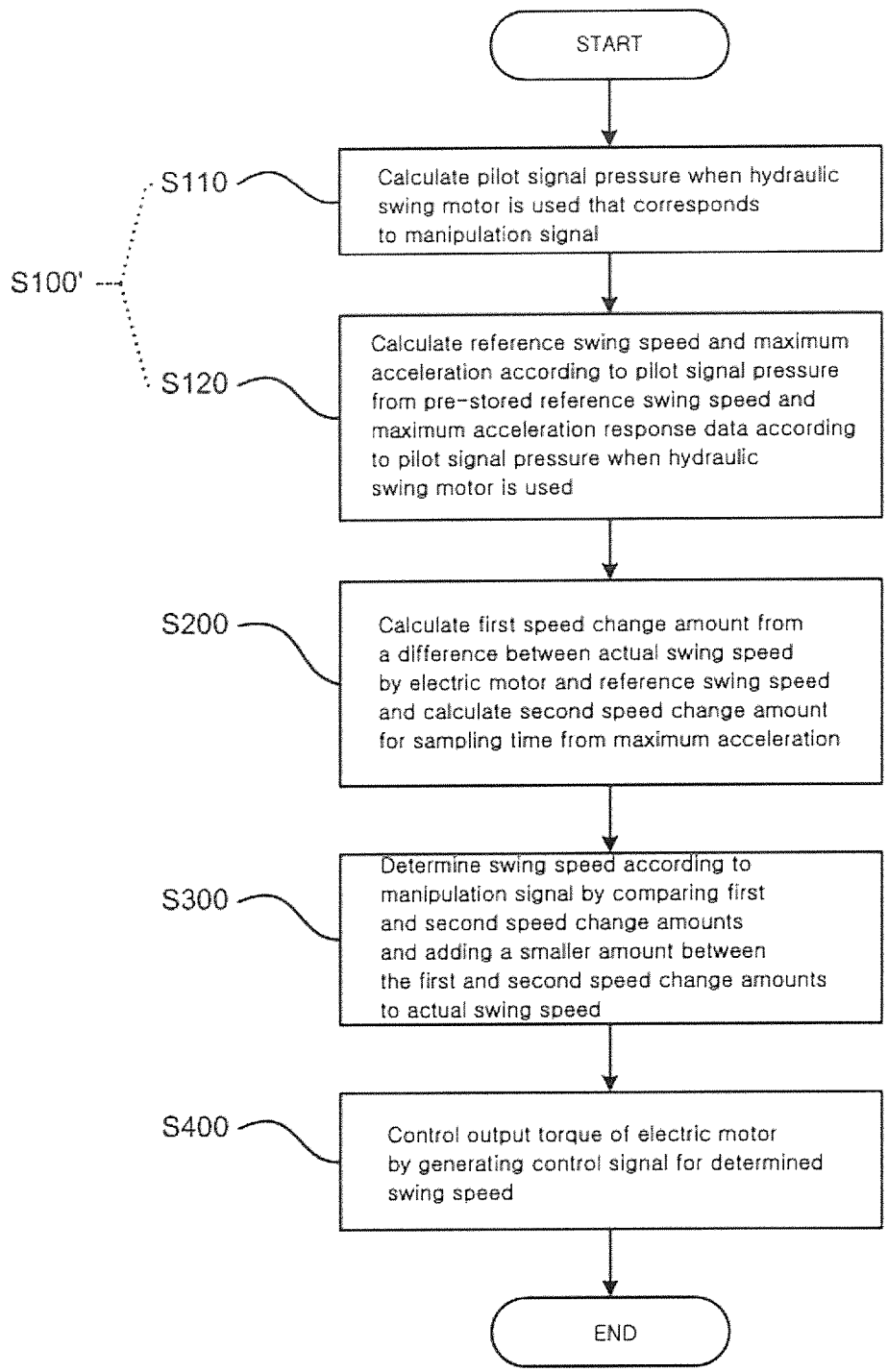
FIG. 5 is a flowchart illustrating a swing control method for a construction machine using an electric motor according to still another embodiment of the present invention.

FIG. 4 is a flowchart illustrating a swing control method for a construction machine using an electric motor according to another embodiment of the present invention, and FIG. 5 is a flowchart illustrating a swing control method for a construction machine using an electric motor according to still another embodiment of the present invention.

Referring to FIGS. 2, 4, and 5, the swing control method for a construction machine using the electric motor according to another embodiment of the present invention includes a reference speed calculation step S100 or S100', a speed change amount calculation step S200, a swing speed determination step S300, and an output torque control step S400.

In the reference speed calculation step S100 or S100', the reference swing speed and the maximum acceleration according to the manipulation signal of the control lever for the swing manipulation are calculated.

Referring to reference numerals 17 and 26 in FIG. 2, in the reference speed calculation step S100, the reference swing speed and the maximum acceleration according the manipulation signal is calculated with limiting of absolute values of the reference swing speed and the maximum acceleration in a predetermined upper limit range. Preferably, the maximum value of the swing speed and the maximum acceleration according to the pilot signal pressure when the hydraulic swing motor is used becomes predetermined upper limit value.

Also, in an embodiment of the present invention, referring to reference numerals 19 and 27 in FIG. 2, in the reference speed calculation step S100, the reference swing speed and the maximum acceleration according to the manipulation signal are calculated, and the reference swing speed and the maximum acceleration are corrected by applying speed and acceleration correction values $K_{mode}$ 19 and 27 according to an engine mode of the construction machine to the calculated reference swing speed and maximum acceleration, respectively.

Referring to FIG. 5, the reference speed calculation step S100' includes a pilot signal pressure calculation step S110 and a reference swing speed calculation step S120. In the pilot signal pressure calculation step S110, the pilot signal pressure when the hydraulic swing motor is used, which corresponds to the manipulation signal, is calculated. Then, in the reference swing speed calculation step S120, the reference swing speed and the maximum acceleration according to the calculated pilot signal pressure are calculated from the pre-stored reference swing speed and maximum acceleration response data according to the pilot signal pressure when the hydraulic swing motor is used.

Then, in the speed change amount calculation step S200, referring to FIG. 2, the actual swing speed by the electric motor 200 is fed back, the first speed change amount 20 is calculated from a difference between the actual swing speed 21 currently fed back and the reference swing speed, and the second speed change amount 28 for the sampling time is calculated from the maximum acceleration.

Referring to FIG. 2, in the speed change amount calculation step S200, the first speed change amount 20 and the second speed change amount 28 are calculated from the corrected reference swing speed and maximum acceleration.

Also, referring to FIG. 5, if the pilot signal pressure calculated in the pilot signal calculation step S110 is smaller than a predetermined value, the first speed change amount 20 is calculated in the speed change amount calculation step S200. Preferably, only the first speed change amount 20 can be calculated without calculating the second speed change amount 28. For example, the state where the joystick angle of the control lever is near a neutral position corresponds to the deceleration or stop command, and the first speed change amount 20 is used without comparing it with the second speed change amount 28 for the sampling time from the maximum acceleration.

Then, referring to FIG. 2, in the swing speed determination step S300, the first speed change amount 20 and the second speed change amount 28 are compared with each other 22, and the swing speed 30 according to the manipulation signal is determined by adding a smaller amount between the first speed change amount 20 and the second speed change amount 28 to the actual swing speed 21 currently fed back.

Also, referring to FIG. 5, if the pilot signal pressure that is calculated in the pilot signal pressure calculation step S110 is smaller than a predetermined value, in the swing speed determination step S300, the swing speed 30 according to the manipulation signal is determined by adding the first speed change amount 20 to the actual swing speed 21 currently fed back without comparing the first speed change amount 20 and the second speed change amount 28. For example, if the joystick angle of the control lever is near a neutral position, this corresponds to a deceleration or stop command, and thus only the first speed change amount 20 is calculated and used without comparing it with the second speed change amount 28 for the sampling time from the maximum acceleration.

In the output torque control step S400, a control signal for the determined swing speed 30 is generated, and the output torque 34 of the electric motor 200 is controlled.

Next, with reference to FIGS. 1 and 2, the swing control process for a construction machine using an electric motor according to an embodiment of the present invention will be described in detail.

FIG. 1 is a block diagram explaining the control of a swing system for construction machine using an electric motor according to an embodiment of the present invention.

The electric motor 200, preferably, the controller of the electric swing system adopting PMSM, receives a joystick angle $\alpha_{joy}$ 1 according to the manipulation of the control lever corresponding to a swing command, information on an engine mode 2 of the construction machine, for example, an excavator, according to the user's manipulation, and information on the current rotating speed to ω12 of PMSM for the speed control. The electric swing controller in FIG. 1 corresponds to the swing control unit 100 according to an embodiment of the present invention.

In accordance with the three kinds of inputs, a motor speed reference regulator 3 outputs a speed command $\omega_{ref}$ and in order to correct an error value 4 with the current rotating speed ω12, a sum of the speed command $\omega_{ref}$ and the error value is input to a speed controller. Preferably, the reference speed calculation means 110 according to an embodiment of the present invention corresponds to the motor speed reference regulator 3 in FIG. 1. Since a torque command value output through the PI control in the speed controller 5 may be larger than the output of the existing hydraulic excavator, it is saturated below the maximum torque value of the existing hydraulic excavator 6, and then is finally output as a torque command $\tau_{ref}$7 of the swing controller. The speed controller 5 in FIG. 1 corresponds to the output torque control means 150 according to an embodiment of the present invention.

Then, if the joystick angle $\alpha_{joy}$ 1 is smaller than a specified value, it means that the user does not apply the swing command. In this case, it is judged as the swing speed deceleration or stop command, and is output as a drive command 13 of a mechanical brake.

The construction machine, for example, a swing plant 8 of the excavator, which receives the drive command from the swing controller, includes a PMSM driver 9, a PMSM 10, and a mechanical brake 11. If the torque command $\tau_{ref}$ is applied from the swing controller to the PMSM driver 9, the PMSM 10 is operated, and the excavator performs the swing operation by the speed output $\omega$ 12 of the PMSM.

FIG. 2 shows in detail a control flow of the swing controller.

Preferably, the joystick angle $\alpha_{joy}$ 14 according to the user's manipulation of the control lever is normalized as a value in the range of −1 to 1, and is input to the swing controller. Here, it is assumed that −1 is the maximum input in a reverse direction, and +1 is the maximum input in a forward direction. Since the pressure of a pilot valve that controls the flow rate in the case of the existing hydraulic motor is adjusted according to the joystick angle $\alpha_{joy}$, and is applied as the speed command of the hydraulic motor, a proportional constant value $K_{\alpha top}$ 15 is applied so that the pilot valve pressure becomes a value that corresponds to the maximum speed command when an absolute value of the normalized joystick angle $\alpha_{joy}$ is "1". In accordance with the applied pilot valve pressure $P_{PV}$, a method of outputting a speed command is derived by constructing a map 16 of speed command $\omega_{ref}$ against the pilot valve pressure $P_{PV}$ of the existing excavator. In this case, the derived speed command saturates the torque of the existing hydraulic motor below the maximum speed value of the existing hydraulic motor 7. Even in the case of the same joystick angle $\alpha_{joy}$, the output of the hydraulic pump is proportionally output according to the engine mode 18 of the excavator, the proportional constant $K_{mode}$ 19 per mode is applied to the speed command $\omega_{ref}$. The map 16 of the speed command $\omega_{ref}$ against the corresponding pilot valve pressure $P_{PV}$ is derived by a simple three-order equation through simulations so that it can provide an output similar that of the existing hydraulic motor when the proportional constant $K_{mode}$ 19 per mode is applied from the data acquired through the experiments. The error value between the speed command $\omega_{ref}(t)$ at present (t) that is determined through the process and the motor speed feedback value $\omega_{ref}(t-1)$ corresponds to the first speed change amount $\Delta\omega_{ref}(t)$ 20.

Also, the second speed change amount $\Delta\omega_{ref}(t)$ 28 is derived by saturating the torque below the maximum acceleration value of the existing hydraulic motor through a map 25 of an acceleration command $\Delta\omega_{ref}$ against the pilot valve pressure $P_{PV}$ according to the pilot valve pressure $P_{PV}$. Also, the map 25 of the acceleration command $\Delta\omega_{ref}$ against the corresponding pilot valve pressure $P_{PV}$ is derived by a simple second-order equation through simulations so that it can provide an output similar to that of the existing hydraulic motor when the proportional constant $K_{mode}$ 27 that is the same as the proportional constant $K_{mode}$ 19 per mode is applied in the same method as the map 16 of the speed command $\omega_{ref}(t)$ against the pilot valve pressure $P_{PV}$.

A smaller amount between the first speed change amount $\Delta\omega_{ref}(t)$ and the second speed change amount $\Delta\omega_{ref}(t)$ 28 is selected as the final speed change amount command 29, and the final speed command $\omega_{ref}(t)$ 30 that is obtained by adding the final speed change amount command to the motor speed $\omega_{ref}(t-1)$ at (t−1) moment is input to the speed controller 31 that controls PI.

However, if the value $P_{PV}$ is smaller than the specified value, the joystick angle is near the neutral state to correspond the deceleration or stop command, and thus the first speed change amount $\Delta\omega_{ref}(t)$ 20 is used without comparing it with the second speed change amount $\Delta\omega_{ref}(t)$ 28. The deceleration appears more quickly than the acceleration due to the deceleration characteristic of the hydraulic motor, wherein the deceleration is performed by blocking the hydraulic flow itself, and thus by reflecting the deceleration characteristic of the existing hydraulic system, the existing users can be prevented from feeling inconvenience. At the same time, the brake drive command 33 during stopping is also output.

Through the above-described process, the final speed command 30 is input to the PI controller 31 to be output as the torque command, is saturated below the maximum torque value of the existing hydraulic motor 32, and then is finally output as the swing controller torque command $\tau_{ref}$ 34.

As described above, the preferred embodiments of the present invention have been described in detail with reference to the accompanying drawings. The aspects and features of the present invention and methods for achieving the aspects and features will be apparent by referring to the embodiments as described above with reference to the accompanying drawings. However, the present invention is not limited to the embodiments as described above, but can be implemented in diverse forms. Although preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A swing control system for a construction machine including a swing electric motor swinging an upper swing structure and a swing control unit, wherein the swing control unit comprises:
    a reference speed calculation means for calculating a reference swing speed and a maximum acceleration according to a manipulation signal of a control lever for a swing manipulation;
    a swing speed determination means for calculating a first speed change amount from a difference between the reference swing speed and an actual swing speed by the electric motor that is currently fed back, calculating a second speed change amount for a sampling time from the maximum acceleration, and determining a swing speed according to the manipulation signal by comparing the first speed change amount and the second speed change amount and adding a smaller amount between the first speed change amount and the second speed change amount obtained as the result of comparison to the actual swing speed currently fed back; and
    an output torque control means for controlling an output torque of the electric motor by generating a control signal for the determined swing speed;
    wherein the reference speed calculation means calculates the reference swing speed and the maximum acceleration according to the manipulation signal with limiting of absolute values of the reference swing speed and the maximum acceleration in a predetermined upper limit range, and the predetermined upper limit is the maximum value of the swing speed and the maximum acceleration according to pilot signal pressure as the maximum values of swing speed and acceleration would be if a hydraulic swing motor were used, instead of the swing electric motor, for swinging the upper swing structure;
    wherein the swing speed determination means determines the swing speed according to the manipulation signal by adding the first speed change amount to the actual swing speed currently fed back without comparing the first speed change amount and the second speed change amount if the pilot signal pressure when the hydraulic swing motor is used, which corresponds to the manipulation signal, is smaller than a predetermined value.

2. The swing control system according to claim 1, wherein the reference speed calculation means calculates the reference swing speed and the maximum acceleration according to the manipulation signal, corrects the reference swing speed and the maximum acceleration by applying speed and acceleration correction values according to an engine mode of the construction machine to the calculated reference swing speed and maximum acceleration, respectively, and transmits the corrected reference swing speed and maximum acceleration to the swing speed determination means.

3. The swing control system according to claim 1, further comprising a memory unit storing reference swing speed and maximum acceleration response data according to the pilot signal pressure when the hydraulic swing motor is used;
wherein the reference speed calculation means of the swing control unit calculates the reference swing speed and the maximum acceleration according to the manipulation signal from the reference swing speed and maximum acceleration response data stored in the memory unit.

4. The swing control system according to claim 3, wherein the reference speed calculation unit calculates the pilot signal pressure when the hydraulic swing motor is used, which corresponds to the manipulation signal, and calculates the reference swing speed and the maximum acceleration according to the calculated pilot signal pressure from the reference swing speed and maximum acceleration response data stored in the memory unit.

5. A swing control method for a construction machine for swinging an upper swing structure using a swing electric motor, comprising:
a reference speed calculation step of calculating a reference swing speed and a maximum acceleration according to a manipulation signal of a control lever for a swing manipulation;
a swing speed change amount calculation step of receiving a feedback of an actual swing speed by the electric motor, calculating a first speed change amount from a difference between the actual swing speed currently fed back and the reference swing speed, and calculating a second speed change amount for a sampling time from the maximum acceleration;
a swing speed determination step of determining a swing speed according to the manipulation signal by comparing the first speed change amount and the second speed change amount and adding a smaller amount between the first speed change amount and the second speed change amount obtained as the result of comparison to the actual swing speed currently fed back; and
an output torque control step of controlling an output torque of the electric motor by generating a control signal for the determined swing speed;
wherein the reference speed calculation step calculates the reference swing speed and the maximum acceleration as they would be with a hydraulic swing motor swinging the upper swing structure instead of the swing electric motor; and corrects the reference swing speed and the maximum acceleration by applying speed and acceleration correction values according to an engine mode of the construction machine to the calculated reference swing speed and maximum acceleration, respectively; and
the speed change amount calculation step calculates the first speed change amount and the second speed change amount from the corrected reference swing speed and maximum acceleration;
wherein the swing speed change amount calculation step calculates the
first speed change amount; and
the swing speed determination step determines the swing speed according to the manipulation signal by adding the first speed change amount to the actual swing speed currently fed back without comparing the first speed change amount and the second speed change amount, if the pilot signal pressure calculated in the pilot signal pressure calculation step is smaller than a predetermined value.

6. The swing control method according to claim 5, wherein the reference speed calculation step calculates the reference swing speed and the maximum acceleration according to the manipulation signal with limiting of absolute values of the reference swing speed and the maximum acceleration in a predetermined upper limit range; and
the predetermined upper limit is the maximum value of the swing speed and the maximum acceleration according to pilot signal pressure if the hydraulic swing motor were used.

7. The swing control method according to claim 6, wherein the reference speed calculation step comprises:
a pilot signal pressure calculation step of calculating the pilot signal pressure when the hydraulic swing motor is used, which corresponds to the manipulation signal; and
a reference swing speed calculation step of calculating the reference swing speed and the maximum acceleration according to the calculated pilot signal pressure from the reference swing speed and maximum acceleration response data according to the pre-stored pilot signal pressure when the hydraulic swing motor is used.

8. The swing control method according to claim 5, wherein the reference speed calculation step comprises:
a pilot signal pressure calculation step of calculating the pilot signal pressure when the hydraulic swing motor is used, which corresponds to the manipulation signal; and
a reference swing speed calculation step of calculating the reference swing speed and the maximum acceleration according to the calculated pilot signal pressure from the reference swing speed and maximum acceleration response data according to the pre-stored pilot signal pressure when the hydraulic swing motor is used.

9. The swing control method according to claim 5, wherein the reference speed calculation step comprises:
a pilot signal pressure calculation step of calculating the pilot signal pressure when the hydraulic swing motor is used, which corresponds to the manipulation signal; and
a reference swing speed calculation step of calculating the reference swing speed and the maximum acceleration according to the calculated pilot signal pressure from the reference swing speed and maximum acceleration response data according to the pre-stored pilot signal pressure when the hydraulic swing motor is used.

* * * * *